United States Patent [19]

Porter

[11] Patent Number: 5,055,428

[45] Date of Patent: Oct. 8, 1991

[54] GLASS FIBER COMPOSITIONS

[75] Inventor: Russell M. Porter, Castleton, Vt.

[73] Assignee: Owens-Corning Fiberglass Corporation, Toledo, Ohio

[21] Appl. No.: 588,398

[22] Filed: Sep. 26, 1990

[51] Int. Cl.$^5$ .................. C03C 13/00; C03C 13/02; C03C 3/091

[52] U.S. Cl. .................. 501/35; 501/38; 501/66

[58] Field of Search .................. 501/35, 38, 66

[56] References Cited

U.S. PATENT DOCUMENTS 4,325,724  4/1982  Froberg .................. 501/35
4,628,038  12/1986  Weirauch, Jr. .................. 501/35

FOREIGN PATENT DOCUMENTS 2080281  2/1982  United Kingdom .................. 501/35

Primary Examiner—Mark L. Bell
Attorney, Agent, or Firm—Patrick P. Pacella; Ted C. Gillespie

[57] ABSTRACT

Based on the discovery that $Al_2O_3$ strongly retards the dissolving rate of insulating glass fibers in a synthetic lung solution, glass fibers having low alumina contents have been identified that dissolve significantly faster in lung fluid. Moreover, these glass fibers still have adequate durability for insulation pruposes and have physical properties which allow current processes to fabricate them into insulation.

10 Claims, No Drawings

GLASS FIBER COMPOSITIONS

TECHNICAL FIELD

The present invention relates to glass compositions and more specifically relates to soda lime aluminoborosilicate glass compositions. Even more specifically the present invention relates to glass fibers formed from these glass compositions and yet more specifically the present invention relates to glass fiber insulation made from the compositions.

BACKGROUND ART

Glass fiber insulation is well known and has been a commercial product for a long period of time. The insulation is made from intertwined soda lime aluminoborosilicate glass fiber which a binder holds together. The binder may be any suitable material but quite commonly is a phenol-formaldehyde resin or a ureaformaldehyde resin. These binders are well known and a spray nozzle generally applies them to the glass fibers as hot gases attenuate the fibers from a rotating device, commonly called a spinner. A conveyo collects the binder-coated fibers in the form of a blanket, and heat cures the blanket to produce the final insulation. The process produces various densities by varying the conveyor speed and the thickness of the cured insulation. This technology is well known.

It is well established that asbestos fibers when inhaled can cause significant disease in man. Though the exact mechanisms responsible for the biological activity of inhaled asbestos fibers is unknown, it is widely believed that their ability to remain in the lung for extended periods of time is an important factor. Glass fibers have not been linked to disease in man. Additionally, their durability or residence time in the lung appears much less than asbestos fibers. Further increasing the solubility of glass fibers would be expected to decrease the time glass fibers will remain in the lung if they are inhaled.

It been known for some time that the dissolution rate of glass fiber in saline solutions similar to those existing in the lung can be significantly increased by altering the chemical composition of the fiber, but it was not obvious that this could be done in such a way that the durability of the fiber insulation for commercial purpose was unimpaired. The present invention describes glass fiber compositions which have increased dissolution rate in physiological saline solutions thought to be similar to those found in the lung but which have adequate durability for commercial insulation applications. Moreover these compositions have physical properties which allow them to be fabricated into glass fiber insulation by the same processes currently used.

DISCLOSURE OF THE INVENTION

Conventional glass compositions, which are suited for insulations, are the soda (or alkaline metal oxide) calcia (or alkaline earth metal oxide) aluminoborosilicate compositions. The constituents in the glass which are of main interest are: $SiO_2$, which is typically present in an amount of 54 to 68 percent by weight; $Al_2O_3$, typically present in amounts up to 8 percent by weight; $B_2O_3$, typically present in amounts up amounts of about 5 to about 18 percent by weight; CaO, typically present in amounts of about 3 to 14 percent by weight; MgO, typically present in amounts up to 10 percent by weight; and $K_2O$, typically present in amounts up to 5 percent by weight. Other materials may also be present in the glass, either as impurities or by choice. Such components may include any one or more of: iron, in amounts up to 2 percent by weight as $Fe_2O$; $TiO_2$ in amounts up to 4 percent by weight; $F_2$ in amounts up to 2 percent by weight; BaO in amounts up to 4 percent by weight; ZnO in amounts up to 4 percent by weight. Table 1 contains three typical examples of such glass compositions together with their relevant physical properties.

Although the exact physical/chemical conditions that a particle encounters in the lung are not known, a number of reasonable assumptions can be made, and these have been used to devise solutions thought to approximate closely those existing in the lung. These solutions have been used by a number of workers to study the dissolution rates of various materials in the lung. Correlation has been found between such laboratory studies and in vivo dissolution, and there is general agreement that such laboratory measurements have predictive power for the in vivo situation. Such a technique has been applied to a number of glass compositions spanning the compositional range typical of glass fiber insulation. Such glass compositions generally have dissolution rates in the range of 50–300 $ng/cm^2$-hr.

The various asbestos minerals have dissolution rates less than 0.1 $ng/cm^2/hr$. Existing glass fibers have solubilities many times greater than this. The glasses described in this patent are significantly more soluble in physiological salt solutions than existing glasses, while maintaining useful commercial properties.

DETAILED DESCRIPTION OF THE INVENTION

TABLE 1

Chemical Compositions and Predicted Properties of Three Typical Glasses for Glass Fiber Insulation[1]

|  | #1a | #2b | #3a |
|---|---|---|---|
| $SiO_2$ | 63.7 | 64.9 | 61.1 |
| $Al_2O_3$ | 3.5 | 2.2 | 4.2 |
| CaO | 7.9 | 8.1 | 9.0 |
| MgO | 3.7 | 2.7 | 2.2 |
| $Na_2O$ | 15.8 | 15.0 | 14.7 |
| $K_2O$ | 0.7 | 0.4 | 0.8 |
| $B_2O_3$ | 4.6 | 6.4 | 7.8 |
| $Fe_2O_3$ | 0.1 | 0.1 | 0.1 |
| $TiO_2$ | 0.1 | 0.1 | 0.1 |
| log3 viscosity temperature (°C.) | 1074 | 1065 | 1042 |
| liquidus temperature (°C.) | 948 | 928 | 947 |
| durability (%)[2] | 3/9 | 3/0 | 3.0 |
| dissolution rate[3] | 83 | 211 | 129 |

[1] Property prediction is based on computer fitting of measured data on many glasses of related composition.
[2] % fiber weight loss after 1 week in distilled water at 96° C.
[3] Rate of weight loss/surface area ($ng/cm^2$-hr) in model physiological saline solution at 37° C. with a flow rate of 0.2 ml/min.

It is not obvious that glass fiber dissolution rate can be reduced while maintaining other necessary glass properties. In order to allow fiberization by currently used methods, glass liquidus and viscosity must both be maintained within a fairly narrow range. The glass fiber must be sufficiently durable to maintain its physical integrity over many years in the location in which it is installed. Liquidus and viscosity provide some constraint on how the glass composition can be altered, but durability provides the greatest constraint. The glass must be fairly inert to moisture attack at the installation site, but it must dissolve quickly in the lung. Since both these situations involve water attack on the glass under near neutral acid-base conditions, it is a surprising discovery that this requirement can be met by glass compositional modifications.

The invention consists of modifying typical glass fiber insulation compositions by a reduction of $Al_2O_3$, coupled with an increase in $B_2O_3$. Generally, but not always, $Na_2O$ is decreased also. This has the effect of increasing the glass dissolution rate in physiological saline solution without degrading the glass durability. Other major oxides such as $SiO_2$, CaO, MgO, and $K_2O$ are adjusted to maintain viscosity, liquidus, and other glass properties. Trace constituents in the glass have no significant effect. The degree to which the glass dissolution rate can be increased without degrading or changing other glass properties depends on the starting glass composition.

INDUSTRIAL APPLICABILITY

Table 2 contains three examples in which this process has been applied to the three compositions in Table 1. In each case, the dissolution rate was increased to the maximum extent possible without changing other glass physical properties. Dissolution rates could be increased to over 600 ng/cm²-hr, a factor of 3-8 times that of the original composition in Table 1. Greater increases would be possible if some change in other physical properties were allowed. The amount of increase also depends on the original glass composition Measurement of the dissolution rates of over 50 different glass fibers compositional modifications have defined the compositional region of glasses which are useful for production of glass fiber insulation and which have dissolution rate constants significantly increased over that of the typical glasses used in glass fiber insulation. This range is as follows for the major components:

| | |
|---|---|
| $SiO_2$ | 61.0 to 69.0 |
| $Al_2O_3$ | 0.0 to 1.9 |
| CaO + MgO | 7.9 to 16.0 |
| $Na_2O$ | 9.0 to 17.0 |
| $B_2O_3$ | 8.7 to 15.0 |

Such glasses may typically contain up to 3% $K_2O$, up to 3% BaO, and less than 1% of any or all of $Fe_2O_3$, $TiO_2$, SrO or $SO_2$.

A preferred range for the major compounds is as follows:

| | |
|---|---|
| $SiO_2$ | 64.0 to 68.0 |
| $Al_2O_3$ | 0.6 to 1.5 |
| CaO + MgO | 7.9 to 10.0 |
| $Na_2O$ | 11.0 to 16.0 |
| $B_2O_3$ | 8.7 to 12.0 |

These glasses also typically contain up to 3% $K_2O$, up to 3% BaO and less than 1% of any or all of $Fe_2O_3$, $TiO_2$, SrO or $SO_2$.

TABLE 2

Chemical Composition and Predicted[1] Properties of Three Typical High Dissolution Rate Glasses with Forming and Durabilities Similar to those of Table 1.

| | 1a | 2a | 3a |
|---|---|---|---|
| $SiO_2$ | 66.4 | 66.7 | 64.9 |
| $Al_2O_3$ | 1.2 | 1.0 | 1.5 |
| CaO | 4.8 | 5.5 | 8.6 |
| MgO | 3.2 | 2.5 | 0.1 |
| $Na_2O$ | 12.9 | 13.9 | 12.5 |
| $K_2O$ | 0.2 | 0.2 | 0.3 |
| $B_2O_3$ | 11.0 | 10.0 | 11.9 |
| $Fe_2O_3$ | 0.1 | 0.1 | 0.1 |
| $TiO_2$ | 0.1 | 0.1 | 0.1 |
| log3 Viscosity Temperature (°C.) | 1074 | 1065 | 1042 |
| Liquidus Temperature (°C.) | 948 | 928 | 947 |
| Durability[2] | 3.7 | 3.9 | 3.0 |
| Dissolution rate[3] | 681 | 624 | 717 |

[1] Property prediction is based on computer fitting of measured data on many glasses of related composition.
[2] % fiber weight loss after 1 week in distilled water at 96° C.
[3] Rate of weight loss/surface area (ng/cm²-hr) in model physiological saline solution at 37° C. with a flow rate of 0.2 ml/min.

The dissolution rates of the glasses of Table 2 increase to over 600 mg/cm²-hr, a factor of 3-8 times that of the original composition in Table 1.

I claim:

1. Fiberizable glass compositions suitable for insulation consisting essentially of:

| | |
|---|---|
| $SiO_2$ | 61.0 to 69.0 |
| $Al_2O_3$ | 0.0 to 1.9 |
| CaO + MgO | 7.9 to 16.0 |
| $Na_2O$ | 9.0 to 17.0 |
| $B_2O_3$ | 8.7 to 15.0 | the remainder being up to 3%, $K_2O$, up to 3% BaO, and less than 1% of any of all of $Fe_2O_3$, $TiO_2$, SrO or $SO_2$, the total being 100% by weight.

2. Fiberizable glass compositions suitable for insulation consisting essentially of:

| | |
|---|---|
| $SiO_2$ | 64.0 to 68.0 |
| $Al_2O_3$ | 0.6 to 1.5 |
| CaO + MgO | 7.9 to 10.0 |
| $Na_2O$ | 11.0 to 16.0 |
| $B_2O_3$ | 8.7 to 12.0 | the remainder being up to 3% $K_2O$, up to 3% BaO and less than 1% of any or all of $Fe_2O_3$, $TiO_2$, SrO or $SO_2$, the total being 100% by weight.

3. A glass composition according to claim 1 having the compositions:

| | |
|---|---|
| $SiO_2$ | 66.4 |
| $Al_2O_3$ | 1.2 |
| CaO | 4.8 |
| MgO | 3.2 |
| $Na_2O$ | 12.9 |
| $K_2O$ | 0.2 |
| $B_2O_3$ | 11.0 |
| $Fe_2O_3$ | 0.1 |
| $TiO_2$ | 0.1. |

4. A glass composition according to claim 1 having the composition:

| | |
|---|---|
| $SiO_2$ | 66.7 |
| $Al_2O_3$ | 1.0 |
| CaO | 5.5 |

-continued

| | |
|---|---|
| MgO | 2.5 |
| Na$_2$O | 13.9 |
| K$_2$O | 0.2 |
| B$_2$O$_3$ | 10.0 |
| Fe$_2$O$_3$ | 0.1 |
| TiO$_2$ | 0.1. |

5. A glass composition according to claim 1 having the composition:

| | |
|---|---|
| SiO$_2$ | 64.9 |
| Al$_2$O$_3$ | 1.5 |
| CaO | 8.6 |
| MgO | 0.1 |
| Na$_2$O | 12.5 |
| K$_2$O | 0.3 |
| B$_2$O$_3$ | 11.9 |
| Fe$_2$O$_3$ | 0.1 |
| TiO$_2$ | 0.1. |

6. Glass fiber insulation comprises of soda lime aluminoborosilicate glass fibers having a glass composition consisting essentially of:

| | |
|---|---|
| SiO$_2$ | 61.0 to 69.0 |
| Al$_2$O$_3$ | 0.6 to 1.5 |
| CaO + MgO | 7.9 to 10.0 |
| Na$_2$O | 11.0 to 16.0 |
| B$_2$O$_3$ | 8.7 to 12.0 | the remainder being up to 3% K$_2$O, up to 3% BaO and less than 1% of any or all of Fe$_2$O$_3$, SrO or SO$_2$, the total being 100% by weight.

7. Glass fiber insulation comprises of soda lime aluminoborosilicate glass fibers having a glass composition consisting essentially of:

| | |
|---|---|
| SiO$_2$ | 64.0 to 68.0 |
| Al$_2$O$_3$ | 0.6 to 1.5 |
| CaO + MgO | 7.9 to 10.0 |
| Na$_2$O | 11.0 to 16.0 |
| B$_2$O$_3$ | 8.7 to 12.0 | the remainder being up to 3% K$_2$O, up to 3% BaO and less than 1% of any or all of Fe$_2$O$_3$, TiO$_2$, SrO or SO$_2$, the total being 100% by weight.

8. Glass fiber insulation according to claim 6 having a glass composition of:

| | |
|---|---|
| SiO$_2$ | 66.4 |
| Al$_2$O$_3$ | 1.2 |
| CaO | 4.8 |
| MgO | 3.2 |
| Na$_2$O | 12.9 |
| K$_2$O | 0.2 |
| B$_2$O$_3$ | 11.0 |
| Fe$_2$O$_3$ | 0.1 |
| TiO$_2$ | 0.1. |

9. Glass fiber insulation according to claim 6 having a glass composition of:

| | |
|---|---|
| SiO$_2$ | 66.7 |
| Al$_2$O$_3$ | 1.0 |
| CaO | 5.5 |
| MgO | 2.5 |
| Na$_2$O | 13.9 |
| K$_2$O | 0.2 |
| B$_2$O$_3$ | 10.0 |
| Fe$_2$O$_3$ | 0.1 |
| TiO$_2$ | 0.1. |

10. Glass fiber insulation according to claim 6 having a glass composition of:

| | |
|---|---|
| SiO$_2$ | 64.9 |
| Al$_2$O$_3$ | 1.5 |
| CaO | 8.6 |
| MgO | 0.1 |
| Na$_2$O | 12.5 |
| K$_2$O | 0.3 |
| B$_2$O$_3$ | 11.9 |
| Fe$_2$O$_3$ | 0.1 |
| TiO$_2$ | 0.1. |

* * * * *

UNITED STATES PATENT AND TRADEMARK OFFICE
CERTIFICATE OF CORRECTION

PATENT NO.   : 5,055,428
DATED        : October 8, 1991
INVENTOR(S)  : Russell M. Potter It is certified that error appears in the above-identified patent and that said Letters Patent is hereby corrected as shown below:

Item [75] on the cover page of the patent the following inventor's name should read:

Russell M. Potter

Signed and Sealed this

Fifteenth Day of June, 1993

Attest:

MICHAEL K. KIRK

Attesting Officer

Acting Commissioner of Patents and Trademarks